US009332523B2

(12) United States Patent
Zhang et al.

(10) Patent No.: US 9,332,523 B2
(45) Date of Patent: May 3, 2016

(54) SYSTEMS AND METHODS OF OFFLOADED POSITIONING FOR DETERMINING LOCATION OF WLAN NODES

(71) Applicant: QUALCOMM Incorporated, San Diego, CA (US)

(72) Inventors: Xiaoxin Zhang, Fremont, CA (US); Carlos Horacio Aldana, Mountain View, CA (US); Sandip Homchaudhuri, San Jose, CA (US); James Simon Cho, Mountain View, CA (US)

(73) Assignee: Qualcomm, Incorporated, San Diego, CA (US)

( * ) Notice: Subject to any disclaimer, the term of this patent is extended or adjusted under 35 U.S.C. 154(b) by 72 days.

(21) Appl. No.: 14/272,844

(22) Filed: May 8, 2014

(65) Prior Publication Data

US 2014/0335891 A1    Nov. 13, 2014

Related U.S. Application Data

(60) Provisional application No. 61/821,859, filed on May 10, 2013.

(51) Int. Cl.
*H04W 64/00* (2009.01)
*G01S 5/02* (2010.01)

(52) U.S. Cl.
CPC ........... *H04W 64/003* (2013.01); *G01S 5/0205* (2013.01)

(58) Field of Classification Search
None
See application file for complete search history.

(56) References Cited

U.S. PATENT DOCUMENTS

| 5,974,057 | A  | * | 10/1999 | Rozanski, Jr. | H04B 17/364 370/519 |
| 6,300,905 | B1 | * | 10/2001 | Chen | G01S 3/14 342/457 |
| 6,556,835 | B1 | * | 4/2003 | Raivisto | H04L 63/0428 370/432 |
| 6,681,099 | B1 | * | 1/2004 | Keranen | H04W 64/00 342/357.25 |
| 6,728,545 | B1 | * | 4/2004 | Belcea | G01S 5/0284 342/357.64 |

(Continued)

FOREIGN PATENT DOCUMENTS

| WO | WO-2013020122 A2 | 2/2013 |
| WO | WO-2013117966 A1 | 8/2013 |
| WO | WO-2014007754 A2 | 1/2014 |

OTHER PUBLICATIONS

International Search Report and Written Opinion—PCT/US2014/037573—ISA/EPO—Dec. 22, 2014.

*Primary Examiner* — Kimberly A Williams
(74) *Attorney, Agent, or Firm* — Bay Area Technology Law Group PC (57) ABSTRACT

This disclosure includes systems and methods for determining the location of each of a plurality of STAs of a WLAN where an AP measures the round-trip time (RTT) and the angle of arrival (AOA) to each STA from implicit packet exchange, such as data frame and ACK frame. The AP may then report the RTT and AOA measurements to each STA using a dedicated beacon information element (IE) which multicasts RTT and AOA measurements to the STAs. By employing an additional parameter, namely, angle of arrival AOA, a single AP may compute the two-dimensional location of each associated STA. Further, another beacon IE may multicast mapping of the AIDs to MAC addresses so that the associated STAs can understand such mapping for STAs in a network so that one STA may know the location of other STAs. Encryption may be employed to achieve privacy.

30 Claims, 9 Drawing Sheets

(56) References Cited

U.S. PATENT DOCUMENTS

| | | | |
|---|---|---|---|
| 6,745,036 B1* | 6/2004 | Dunne | G01S 5/00 455/422.1 |
| 8,213,957 B2 | 7/2012 | Bull | |
| 8,452,964 B2* | 5/2013 | Hahn | H04L 9/12 380/277 |
| 8,554,245 B2 | 10/2013 | Stewart | |
| 2005/0037775 A1* | 2/2005 | Moeglein | G01S 5/0036 455/456.1 |
| 2008/0248741 A1* | 10/2008 | Alizadeh-Shabdiz | G01S 5/0294 455/3.02 |
| 2009/0143080 A1* | 6/2009 | Brede | H04W 88/02 455/456.6 |
| 2010/0159958 A1 | 6/2010 | Naguib et al. | |
| 2012/0302254 A1* | 11/2012 | Charbit | H04W 4/005 455/456.1 |
| 2013/0336230 A1* | 12/2013 | Zou | H04W 72/085 370/329 |
| 2013/0337767 A1 | 12/2013 | Siomina et al. | |
| 2014/0070996 A1* | 3/2014 | Kneckt | H04W 64/006 342/386 |
| 2014/0241175 A1* | 8/2014 | Schell | H04W 4/06 370/252 |
| 2014/0274160 A1* | 9/2014 | Xiao | H04W 4/025 455/456.5 |
| 2015/0057008 A1* | 2/2015 | Seok | H04L 5/0092 455/452.1 |
| 2015/0099538 A1* | 4/2015 | Wang | H04W 4/02 455/456.1 |
| 2015/0133157 A1* | 5/2015 | Xiao | G01S 5/06 455/456.1 |
| 2015/0208262 A1* | 7/2015 | Siomina | H04W 64/00 370/252 |

* cited by examiner

| Element | Element ID | Length of indicated element (in octets) | Extensible |
|---|---|---|---|
| RTT and AOA Measurements | 223 | 8 to 254 | Yes |

The RTT and AOA Measurements element is used to report the RTT and AOA measurements from an AP to one or more associated STAs.

FIG. 5

| Element ID | Length | Measurement |
|---|---|---|
| 1 | 1 | N x 6 |

Octets:

FIG. 6

| AID | RTT | AOA | Reserved |
|---|---|---|---|
| 16 | 18 | 12 | 2 |

Bits:

FIG. 7

| Element | Element ID | Length of indicated element (in octets) | Extensible |
|---|---|---|---|
| AID to MAC Address | 224 | 18 to 250 | Yes |

The AID to MAC Address element is used by an AP to report the mapping of AIDs to MAC addresses to the associated STAs for STAs which have agreed to participate in this social positioning.

FIG. 8

| Element ID | Length | Mapping |
|---|---|---|
| 1 | 1 | N x 8 |

Octets:

FIG. 9

| AID | MAC Address |
|---|---|
| 2 | 6 |

Octets:

SYSTEMS AND METHODS OF OFFLOADED POSITIONING FOR DETERMINING LOCATION OF WLAN NODES

RELATED APPLICATIONS

This application claims priority to U.S. Provisional Patent Application Ser. No. 61/821,859, filed May 10, 2013.

FIELD OF THE PRESENT DISCLOSURE

The present disclosure relates generally to communication systems, and more particularly to multicasting round-trip time (RTT) and Angle of Arrival (AOA) measurements to at least one station node in a wireless local area network to compute the two-dimensional position of the station nodes while requiring fewer Access Points and resulting in reduced throughput impact.

BACKGROUND

Indoor networks are increasingly being used in businesses and homes to provide network connectivity over a small area such as an office building or home. Indoor location devices are often based on Wi-Fi and many function as a wireless local area network (WLAN). The network consists of multiple nodes that provide Wi-Fi signals to devices within range. A typical WLAN has at least one Access Point (AP) node and a plurality of Station nodes (STA) which can each communicate with the Access Point with which it is associated. It is becoming increasingly important for each node to determine and maintain information about its precise location as well as its position relative to the other nodes in the network. Such capabilities are generally termed "location awareness" and are considered desirable currently as well as being anticipated to be widely available in the future.

A current standard for carrying out location awareness requires that explicit data packets be sent between nodes to measure round-trip time (RTT) which requires a substantial amount of overhead and reduces network throughput. Under conventional techniques, RTT is measured from an explicit packet exchange comprising 1) a Timing Measurement Request Frame, 2) an acknowledgement (ACK) frame, 3) a Timing Measurement frame and 4) an ACK frame. Moreover, because RTT is the current positioning parameter, only the relative distance between an AP and a STA can be determined. To compute the two-dimensional location of a STA, at least three APs are required. Such a requirement results in a substantial number of packet exchanges and reduces network throughput. Basically, in the current implementation for estimating a position of a wireless node (STA), round-trip time to an AP is the usual available information which provides only relative distance based upon the speed of light. Each STA must then determine RTT to two additional APs to, in effect, triangulate its location using at least three independent RTT measurements.

There is therefore an existing need to carry out node location assessments while reducing the number of packet exchanges required and thus reducing network overhead. It would also be desirable to provide location awareness by using only one AP for a plurality of associated STA nodes to determine their respective locations in a network. The techniques of this disclosure satisfy these and other needs as will be appreciated in view of the following materials.

SUMMARY

This disclosure includes methods for determining the location of at least one station in a wireless communications network managed by an access point. In one aspect, a suitable method may involve determining with the access point an RTT of a wireless transmission including a first implicit frame sent from the access point to the at least one station and a second implicit frame sent from the at least one station to the access point, determining with the access point an AOA of a wireless transmission including a first implicit frame sent from the at least one station to the access point and multicasting with the access point location information including the determined RTT and the determined AOA for the at least one station. The access point may also determine RTT and AOA for each of a plurality of stations, such that multicasting the location information includes the determined RTT and AOA for each of the plurality of stations.

In one aspect, determining the RTT may include recording a departure time for the first implicit frame, recording an arrival time for the second implicit frame and determining the RTT using the departure time and the arrival time. As desired, determining the RTT may involve compensating for a short interframe space (SIFS) between the first implicit frame and the second implicit frame.

In one aspect, the determined RTT and the determined AOA may be included into a beacon transmission.

In one aspect, the determined RTT and AOA for each of the plurality of stations may be correlated with a network address identifier (AID). The access point may also multicast mapping information that associates the AID for each of the plurality of stations with an identification that is independent of the wireless communications network. Further, the mapping information may be encrypted before multicast. Additionally, the access point may transmit a key for decrypting the mapping information to a subset of the plurality of stations that have elected to participate in location determination.

This disclosure also includes a method for determining a location of a station that may involve receiving with the station at least a first implicit frame transmitted by an access point, transmitting with the station at least a second implicit frame to the access point, receiving with the station a multicast from the access point having location information including an RTT and an AOA determined using the implicit frames and determining at the station the location of the station using the multicast location information.

In one aspect, the multicast of location information received from the access point may include a determined RTT and a determined AOA for at least one additional station and the station may determine a location of the at least one additional station using the determined RTT and the determined AOA. Further, the station may determine a position of the station relative to the at least one additional station using the determined location of the station and the determined location of the at least one additional station.

In one aspect, the determined RTT and AOA for the at least one additional station may be correlated with an AID. The station may receive a multicast from the access point having mapping information that associates the AID for the at least one additional station with an identification that is independent of the wireless communications network. Further, the mapping information multicast by the access point may be encrypted and the station may receive a key for decrypting the mapping information from the access point transmitted to stations that have elected to participate in location determination and use the key to decrypt the mapping information.

This disclosure also includes a wireless communications device for determining a location of a station in a WLAN having a WLAN module and a location manager, wherein the location manager may determine an RTT of a wireless transmission including a first implicit frame sent from the wireless communications device to a first station and a second implicit frame sent from the first station to the wireless communications device, determine an AOA of a wireless transmission including a first implicit frame sent from the first station to the wireless communications device and multicast location information with the WLAN module including the determined RTT and the determined AOA for the first station. Further, the location manager may determine RTT and AOA for each of a plurality of stations and multicast location information including the determined RTT and AOA for each of the plurality of stations.

In one aspect, the location manager may determine the RTT by recording a departure time for the first implicit frame, recording an arrival time for the second implicit frame and determining the RTT using the departure time and the arrival time. The location manager may also compensate for a SIFS between the first implicit frame and the second implicit frame when determining RTT.

In one aspect, the location manager may multicast location information with the WLAN module by including the determined RTT and the determined AOA into a beacon transmission.

In one aspect, the determined RTT and AOA for each of the plurality of stations may be correlated with an AID. Further, the location manager may multicast with the WLAN module mapping information that associates the AID for each of the plurality of stations with an identification that is independent of the wireless communications network. As desired, the mapping information may be encrypted. The location manager may also transmit with the WLAN module a key for decrypting the mapping information to a subset of the plurality of stations that have elected to participate in location determination.

This disclosure also includes a wireless communications device for determining a location of a station in a WLAN having a WLAN module and a location manager, wherein the location manager may receive at least a first implicit frame transmitted by an access point, transmit with the WLAN module at least a second implicit frame to the access point and determine a location of the wireless communications device using location information multicast by the access point that includes an RTT and an AOA determined using the implicit frames. The multicast of location information received from the access point may also include a determined RTT and a determined AOA for at least one additional station such that the location manager may determine a location of the at least one additional station using the determined RTT and the determined AOA. Further, the location manager may determine a position of the wireless communications device relative to the at least one additional station using the determined location of the wireless communications device and the determined location of the at least one additional station.

In one aspect, the determined RTT and AOA for the at least one additional station may be correlated with an AID. The location manager may associate the AID for the at least one additional station with an identification that is independent of the wireless communications network using mapping information multicast by the access point. Further, the mapping information multicast by the access point may be encrypted and the location manager may decrypt the mapping information from the access point using a key transmitted by the access point to stations that have elected to participate in location determination.

BRIEF DESCRIPTION OF THE DRAWINGS

Further features and advantages will become apparent from the following and more particular description of the exemplary embodiments of the disclosure, as illustrated in the accompanying drawings, and in which like referenced characters generally refer to the same parts or elements throughout the views, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component", "module", "system", and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices directly or indirectly connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband CDMA (W-CDMA). CDMA2000 covers IS-2000, IS-95 and technology such as Global System for Mobile Communications (GSM).

An OFDMA network may implement a radio technology such as Evolved UTRA (E-UTRA), the Institute of Electrical and Electronics Engineers (IEEE) 802.11, IEEE 802.16, IEEE 802.20, Flash-OFDAM®, etc. UTRA, E-UTRA, and GSM are part of Universal Mobile Telecommunication System (UMTS). Long Term Evolution (LTE) is a release of UMTS that uses E-UTRA, UTRA, E-UTRA, GSM, UMTS and LTE are described in documents from an organization named "3rd Generation Partnership Project" (3GPP). CDMA2000 is described in documents from an organization named "3rd Generation Partnership Project 2) (3GPP2). These various radio technologies and standards are known in the art. The techniques described herein may be utilized in various applications involving wireless transmissions, such as personal area networks (PANs), body area networks (BANs), location, Bluetooth®, Global Positioning System (GPS), ultra-wideband (UWB), radio-frequency identification (RFID), and the like. Further, the techniques may also be utilized in wired systems, such as cable modems, fiber-based systems, and the like.

Wireless networks such as those described above, are increasingly being used in conjunction with smaller local networks for internet access and other services. Wi-Fi is one example of such local networks. Wi-Fi is a popular technology that allows an electronic device to exchange data wirelessly (using radio waves) over a computer network, including high-speed Internet connections. The Wi-Fi Alliance® defines Wi-Fi as "any wireless local area network (WLAN) product that is based on the Institute of Electrical and Electronics Engineers (IEEE) 802.11 standards".

A device that may use Wi-Fi may be a personal computer, video game console, smartphone or digital audio player. The device connects to a network resource such as the Internet via a wireless network access point. Such an access point may also be known as a hotspot. These access points have a range of approximately 65 feet indoors with a range slightly greater outdoors. Hotspot coverage may comprise an area as small as a single room with walls that block radio waves or may be as large as several miles when overlapping access points are connected.

Wi-Fi technologies based on the IEEE 802.11 standard are enforced by the Wi-Fi Alliance. This includes wireless local area network (WLAN) connections, device to device connectivity (such as Wi-Fi Peer to Peer, also known as Wi-Fi Direct), personal area network (PAN), local area network (LAN) and even some limited wide area network (WAN) connections are covered by the Wi-Fi Alliance and versions of IEEE 802.11 standards.

In order to connect to a Wi-Fi LAN, a computer or other device may be equipped with a wireless network interface controller. The combination of the computer and device may be known as a station. All stations share a single radio frequency communication channel. Transmission on this channel may be received by all stations within range. The hardware does not signal the user that the transmission was delivered and therefore, the delivery mechanism is known as a "best effort" delivery mechanism. A carrier wave transmits the data in packets, which may be referred to as "Ethernet frames". Each station may be constantly tuned to the radio frequency communication channel in order to receive available transmission.

A Wi-Fi enabled device may connect to the Internet or other resource when within range of a wireless network. Wi-Fi may provide service in private homes, coffee shops and other businesses, hospitals and organizations such as airports, hotels and others.

Service may be provided by routers that may incorporate a digital subscriber line modem or cable modem that is connected to the Wi-Fi access point. This connection may be either wired or wireless. When subscribed to a cellular phone carrier, access points allow nearby Wi-Fi stations to access the Internet or other network over 2G, 3G, or 4G networks. Many smartphones also include the capability of serving as a Wi-Fi access point and standalone facilities that provide internet access.

Wi-Fi also allows direct computer to computer communication without using an access point as an intermediary. This is known as ad hoc Wi-Fi Communication or Wi-Fi Direct and may be used by handheld game consoles, digital cameras and other portable electronic devices. Some of these devices may also share their Internet connection, making them "virtual routers" and may be referred to as software-enabled APs (softAPs).

Wi-Fi offers the advantage of cheaper network deployment for LANs and is often used where cables cannot be run, such as outdoor areas and historical buildings. Most recent consumer devices include wireless network adapters, thus helping to foster use of the technology.

Wi-Fi networks may be characterized by a defined range. A typical wireless access point compliant with the IEEE 802.11-b or IEEE 802.11-g standard and using a stock antenna may have a range of 120 feet indoors and 300 feet outdoors. This range may be more than doubled by using an IEEE 802.11-n network. Range may also vary with frequency band. Wi-Fi in the 2.4 GHz band may have a slightly better range than Wi-Fi in the 5 GHz band used by the IEEE 802.11-aa standard and is optional for IEEE 802.11-n standard. On wireless routers with detachable antennas, it is possible to improve the range by fitting an upgraded antenna with higher gain in the desired direction. This may be particularly effective in indoor applications. Thus, effectively computing range is an important consideration in establishing a Wi-Fi access point within a network.

Wi-Fi signatures may be used for indoor positioning by mapping the Wi-Fi signatures to expected values at any given region in the map to obtain a probabilistic position. Two Wi-Fi signatures, received signal strength indicator (RSSI) and round trip time (RTT) may be used for positioning a mobile device. The position estimation may be made because the distance between wireless nodes, such as an access point (AP) and a mobile station (STA) may be estimated based on the RTT between the wireless nodes. More precise location assessment may be achieved in the disclosed embodiments by utilizing the RTT parameter in combination with an AOA measurement. By employing both a time-based parameter to derive distance and an angle-based parameter to derive direction, a measurement to compute location of a mobile station may be achieved using a single access point. As used herein, the terms "location" and "position" have equivalent meanings.

Figure 1:
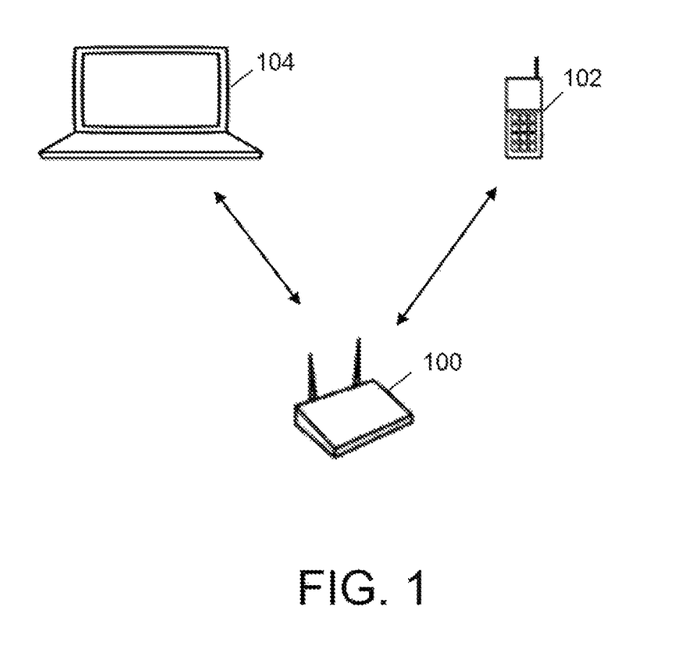
FIG. 1 is a conceptual illustration of measurement of RTT and AOA by AP based on an implicit STA packet communication, according to an embodiment.
Figure 2:
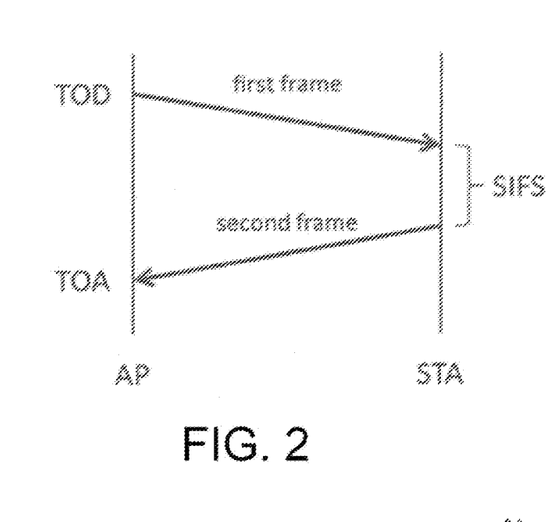
FIG. 2 is a graphical illustration of the RTT Measurement between an AP and an STA, according to an embodiment.
Figure 3:
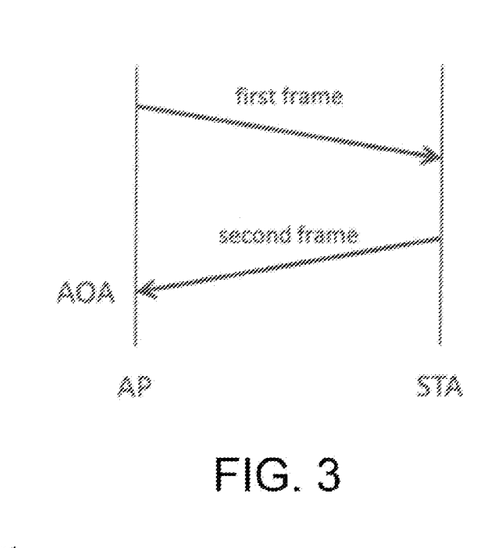
FIG. 3 is a graphical illustration of the AOA Measurement between an AP and an STA, according to an embodiment.
Figure 4:
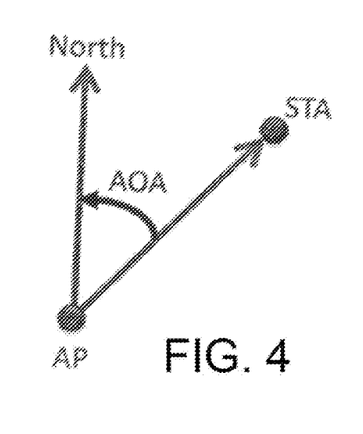
FIG. 4 is a representation of the AOA Measurement, according to an embodiment.

FIG. 1 illustrates an example of a network comprising AP 100 in wireless communication with two mobile STAs, namely, a cell phone 102 and a laptop computer 104. AP 100 may be stationary or mobile as desired and may be a dedicated device or may be a multi-function device capable of acting in the role of an AP, such as a softAP. AP 100 measures the RTT and AOA relative to each STA from implicit packet exchanges as shown in FIGS. 2-4. As used herein the term "implicit" means a typical or usual communication between AP and STA which would be conveyed therebetween even if no location assessment were taking place. Therefore, in one aspect, an implicit communication means the information being exchanged between AP 100 and either of cell phone 102 or laptop computer 104 is unaffected by the location assessment and no additional information is transmitted due to the location assessment. On the other hand, as used herein, the term "explicit" means a special or dedicated communication between AP and STA which may be made for the specific purpose of locating the STAs or for conveying any determined location information regarding the STAs. The disclosed embodiments improve network throughput by relying on the measurements of RTT and AOA on implicit packet exchanges, rather than requiring explicit exchanges as is done conventionally for measurement of RTT.

FIG. 2 illustrates the RTT measurement process. The AP transmits a first implicit frame to the STA and makes note (i.e., "time marker") of the TOD (Time of Departure) of the frame. The STA receives the first implicit frame and responds by transmitting a second implicit frame to the AP, which notes by time marker, the TOA (Time of Arrival). The SIFS or Short Interframe Space interval needs to be accounted for in order to measure RTT accurately. The SIFS is the time from the end of the last symbol or signal extension, if present, of the first frame to the beginning of the first symbol of the preamble of the second frame, as seen at the air interface. A method for accounting for deviations in standard SIFS for each STA is disclosed in patent application Ser. No. 13/826,116 filed on Mar. 14, 2013 (the '116 application) by the assignee hereof and the entire content of that disclosure is hereby incorporated herein by reference as though fully set forth herein. The '116 application discloses a method and apparatus for broadcasting short interframe space information to aid in determining a round trip time. The round trip time may be used as an aid in locating nodes within a Wi-Fi or WLAN network. The method begins with capturing a time of transmission of a frame by a transmitting station. A receiving station then captures the time of arrival of the frame just sent by the transmitting station. The receiving station replies with a received frame message and the time of departure may be captured. The transmitting station then captures the time of arrival of the received frame message. The captured arrival and departure times of the frame and the received frame message allow the round trip time to be computed.

FIG. 3 illustrates the AOA frame transmissions to measure angle of arrival. The AP transmits a first implicit frame that elicits a return of a second implicit frame from the STA which can be used to measure arrival angle using multiple antennas of the AP. (See FIG. 1). In one embodiment, the AOA measurement may use a convention wherein the angle of the AP to STA line relative to due North may be deemed the angle of arrival as shown in FIG. 4.

Figure 5:
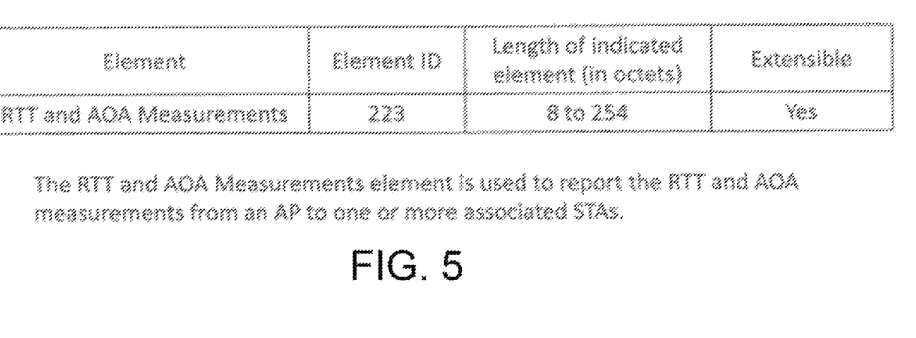
FIG. 5 is a representation of a RTT and AOA Measurements IE, according to an embodiment.
Figure 6:
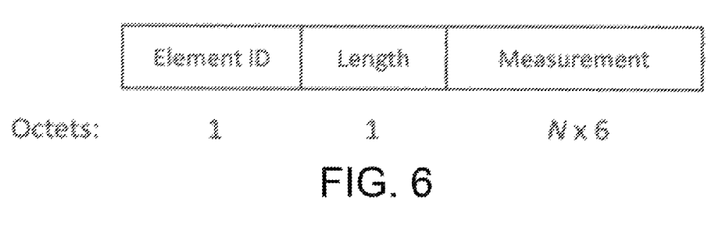
FIG. 6 is a representation of the format of the RTT and AOA Measurements IE of FIG. 5.

As part of some of the disclosed embodiments herein, Applicant defines a new RTT and AOA Measurements information element (IE) of a Beacon frame which may be inserted into Table 8-54 of the IEEE 802.11 standard as for example, Element ID 223 in accordance with FIG. 5. In other embodiments, the RTT and AOA Measurements IE may be incorporated as desired into any suitable frame for transmission, for example, as a proprietary Vendor IE. One exemplary format of the RTT and AOA Measurements IE is shown in FIG. 6, and may include an Element ID field, a Length field and a Measurement field. The Element ID field may be set to a value of 223 as specified in FIG. 5. The Length field may be set to N×6, where N is the number of Sub Measurement fields and is one or more in whole numbers. The Measurement field is composed of N Sub Measurement fields where N is equal to or greater than one.

Figure 7:
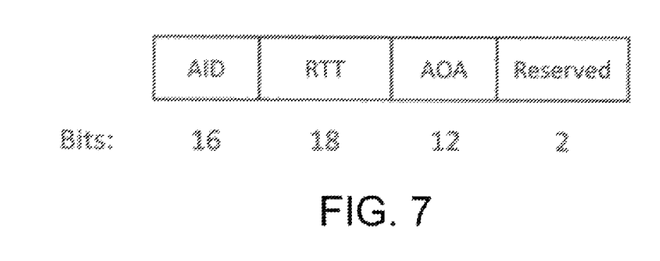
FIG. 7 is a representation of the Sub Measurement field of the RTT and AOA Measurements IE of FIG. 6.

One suitable format of the Sub Measurement field is described in FIG. 7, and may include an Address Identifier (AID) field, an RTT field and an AOA field. The AID field is defined in 8.4.1.8 of the IEEE 802.11 specification for BSS infrastructure operation as "a value assigned by an AP during association that represents the 16-bit ID of a STA". It contains the AID assigned by an AP during association that represents the 16-bit ID of an STA. The RTT field contains an 18-bit RTT measured by an AP to an associated STA with the AID indicated in the AID field. The RTT field may be expressed in units of 0.1 nanoseconds using the procedure shown in FIG. 2. In this example, the AOA field contains a 12-bit AOA measured by an AP to the associated STA with the AID indicated in the AID field. The AOA field may be expressed in units of 0.1 degrees from 0 degrees to 360 degrees as depicted in FIG. 4 and using the procedure shown in FIG. 3.

Accordingly, aspects of this disclosure involve an AP measuring the RTT and the AOA to one or more associated STAs from implicit packet exchanges and multicasting any measured RTTs and AOAs and the correlated with the AIDs to the network using the RTT and AOA Measurements IE, as described above. As desired, the AP may transmit the information to a subset of network nodes in the form of a multicast, which may include at the limit transmitting to all network nodes as a broadcast. In one embodiment, the AP may remove SIFS from RTT using the methods described in the incorporated '116 application. STAs listen to the RTT and AOA Measurements IE to understand the RTTs and AOAs of other STAs in the network, so that a given STA can compute the locations of other STAs and consequently determine their position relative to the given STA.

By providing STAs within the network with location information, interactions between the STAs may be facilitated to provide social networking, direction guidance and other benefits. For example, a user employing a mobile device functioning in the role of a STA in the network may be directed to external resources such as printers, access terminals, point-of-sale locations, airplane gates and any other devices or objects that may be associated with a STA operating on the network. In one aspect, RTT and AOA may be used independently when relating one STA to another STA in the network. As will be appreciated, RTT alone may provide an indication of relative proximity and AOA alone may provide an indication of whether the heading of one STA is expected to intersect with another STA to validate a current path. As another example, when a STA within the network may be associated with a specific user, relative location or proximity information may be used to help users find or otherwise interact with each other.

Figure 8:
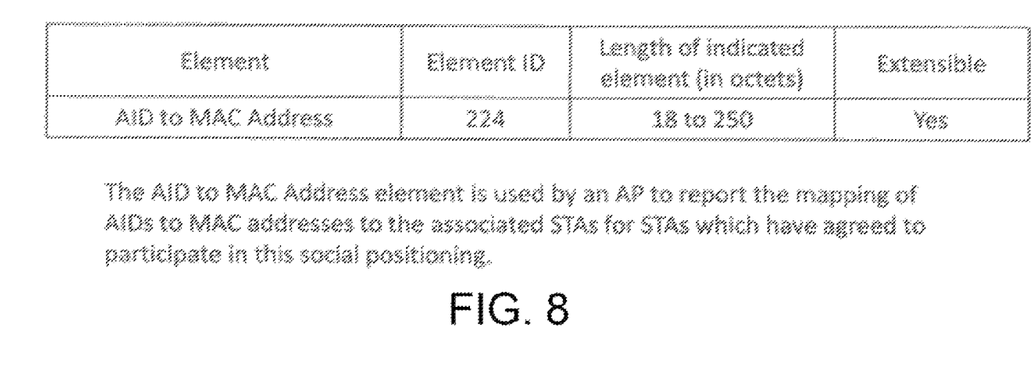
FIG. 8 is a representation of an AID to MAC Address IE, according to an embodiment.
Figure 9:
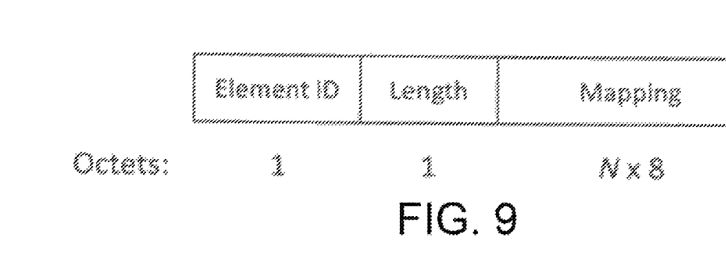
FIG. 9 is a representation of the format of the AID to MAC Address IE of FIG. 8.
Figure 10:
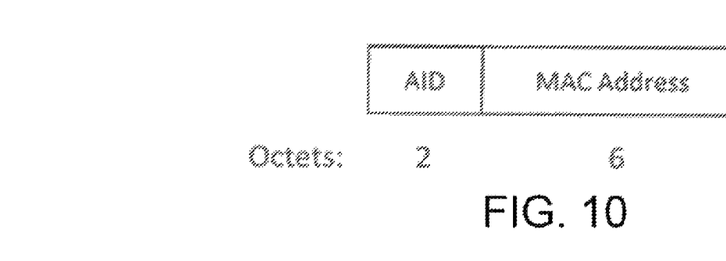
FIG. 10 is a representation of the Sub Mapping Field of the AID to MAC Address IE of FIG. 9.

In some embodiments, an AP may measure the RTT and AOA to associated STAs from implicit packet exchange and multicasts AIDs and measured RTTs and AOAs to the STAs using one or more beacons, for example. However, even though associated STAs may have received the RTTs and AOAs of other STAs in the network and may compute their locations, an AID may only provide an indication of identification relative to the network and may not provide identification outside of the network context, limiting the application of location awareness. As such, the techniques of this disclosure may be extended to correlate the network AID to an identification that is independent of the network, such as a MAC address or other any other suitable unique or specific identifier. Therefore, in one embodiment a dedicated IE may be defined for transmission by the AP to provide mapping of AIDs to the MAC addresses of the associated STAs. An AID to MAC Address IE may be included in a Beacon frame, for example, as Element ID 224 for Table 8-54 of the IEEE 802.11 specification in the embodiment of FIG. 8. In other embodiments, the AID to MAC Address IE may be incorporated as desired into any suitable frame for transmission, for example, as a proprietary Vendor IE. One suitable format of the AID to MAC Address element is shown in FIG. 9 and may include an Element ID field, a Length field and a Mapping field. The Element ID field may be set to the value 224 in the illustrated embodiment. The Length field may be set to N×8 where N is the number of Sub Mapping fields in the Mapping field. N may be equal to or greater than 2. The Mapping field may be composed of N Sub Mapping fields as shown in FIG. 10, including an AID field and a MAC address field. The AID field may be as defined in 8.4.1.8 of the IEEE 802.11 specification. It may contain the AID assigned by an AP during association and that represents the 16-bit ID of the STA. The MAC Address field may contain the 48-bit MAC address defined in the IEEE 802 standard.

An AP multicasts the mapping of AIDs to MAC addresses to associated STAs, by using the AID to MAC Address IE. The AP may not multicast the AID to MAC address IE again until a new STA joins the network. Associated STAs listen to the AID to MAC Address IE to understand the mapping of AIDs to MAC addresses of other STAs in the network. The AP may collect the SIFS information of associated STAs by using the mechanism described in the '116 application as discussed above.

To address privacy concerns, another embodiment provides a handshaking mechanism by the AP will only map the MAC addresses of explicitly participating stations to the corresponding AIDs. In one aspect, the AP may broadcast its ability to offer location awareness to STAs within the network via a proprietary Vendor ID in the beacon. STAs willing to participate in the location awareness system may respond with a management frame using one Vendor IE. The AP may set a threshold (which may be broadcast in the AP Vendor IE) on the total number of participating STAs before initiating the mode. Once an AP initiates location awareness, it may multicast, as part of the Vendor IE for example, a security seed—which the AP can rotate periodically, such as by a configurable period. The AP may use the "seed" to generate a 48-bit encryption key with which it scrambles the MAC addresses.

Thus, as desired the AP may only map AIDs to MAC addresses for STAs which have agreed explicitly to participate. STAs may use the seed to identify what the encryption key would be, and use the key to descramble the MAC addresses. STAs wishing to discontinue location awareness may send the AP a management frame using one Vendor IE.

The accompanying method claims present elements of the various steps in the sample order, and are not meant to be limited to the specific order or hierarchy presented. FIGS. 11 to 14 illustrate in flow chart format various routines that may be employed in described embodiments.

Figure 11:
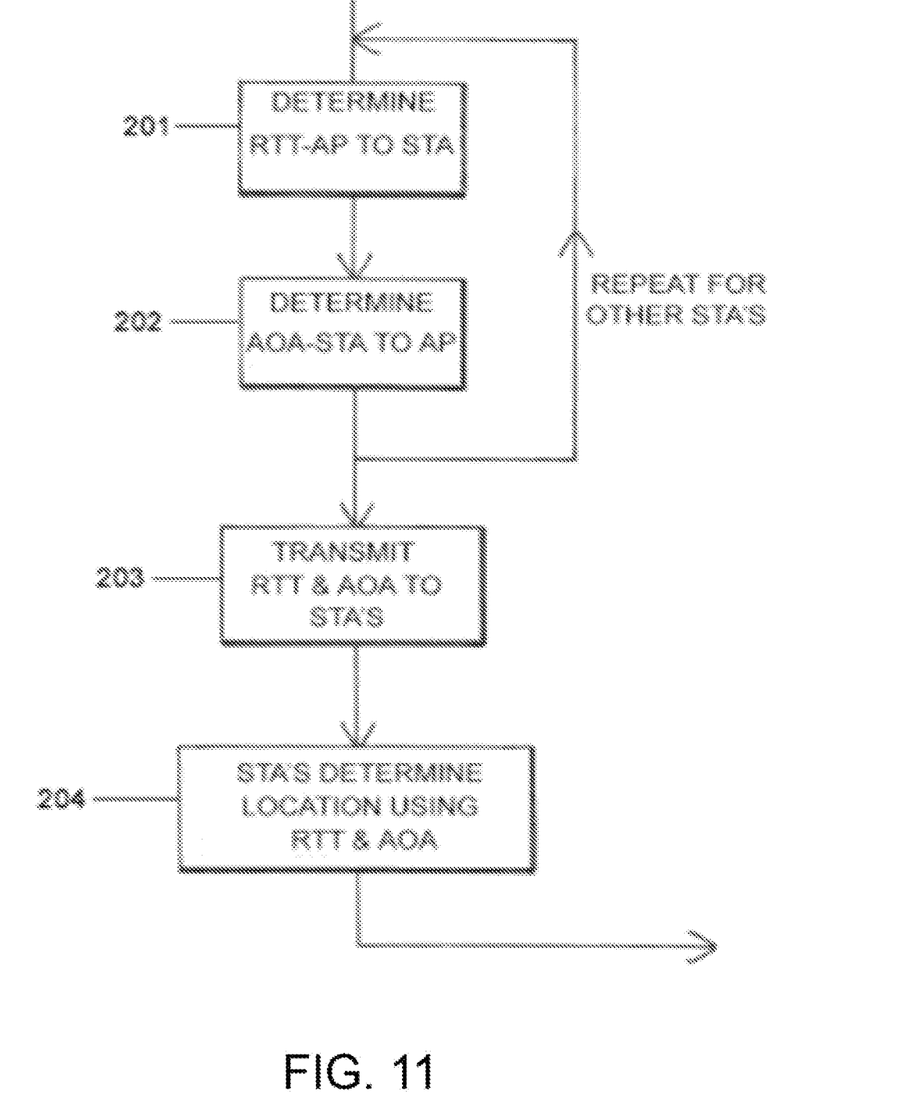
FIG. 11 is a flowchart showing an exemplary routine for determining location for a STA, according to an embodiment.
Figure 12:
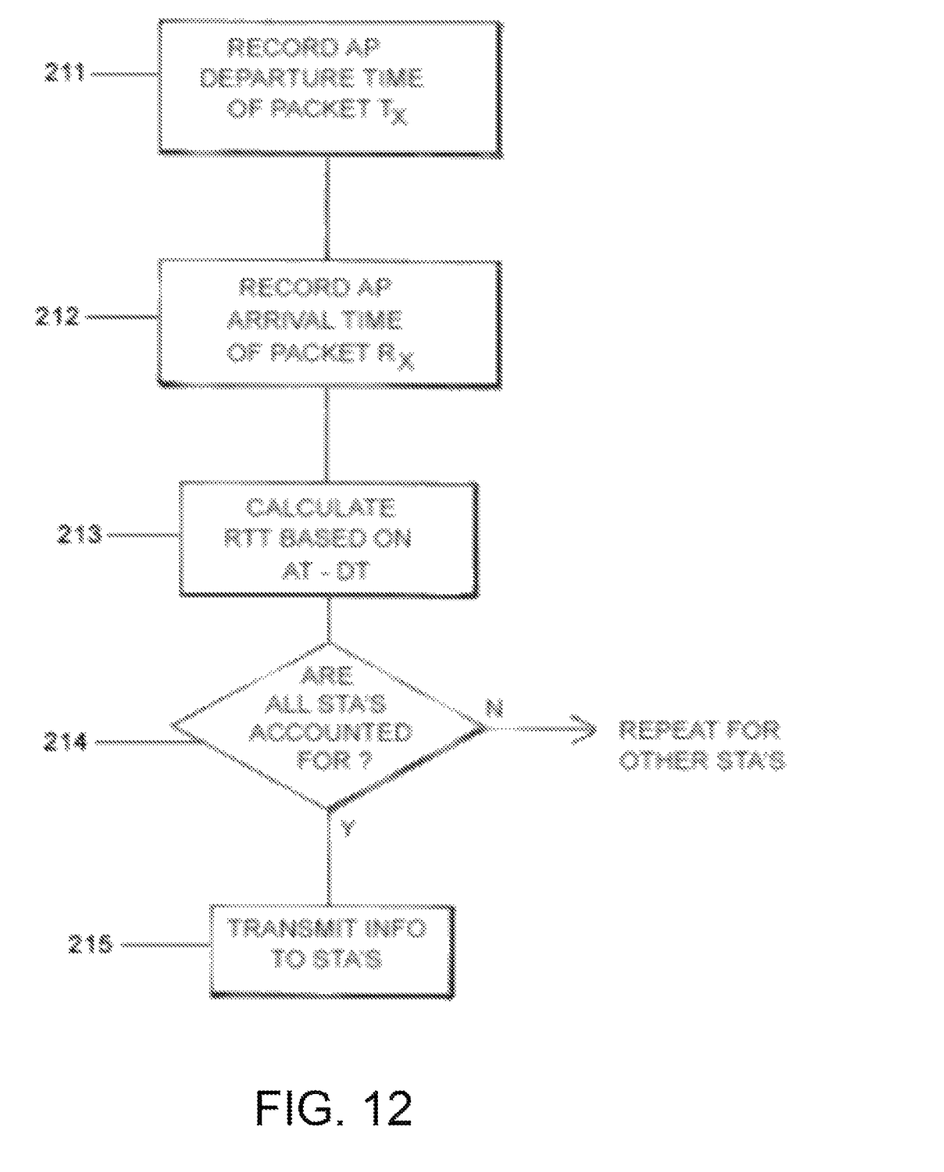
FIG. 12 is a flowchart showing an exemplary routine for measuring RTT, according to an embodiment.
Figure 13:
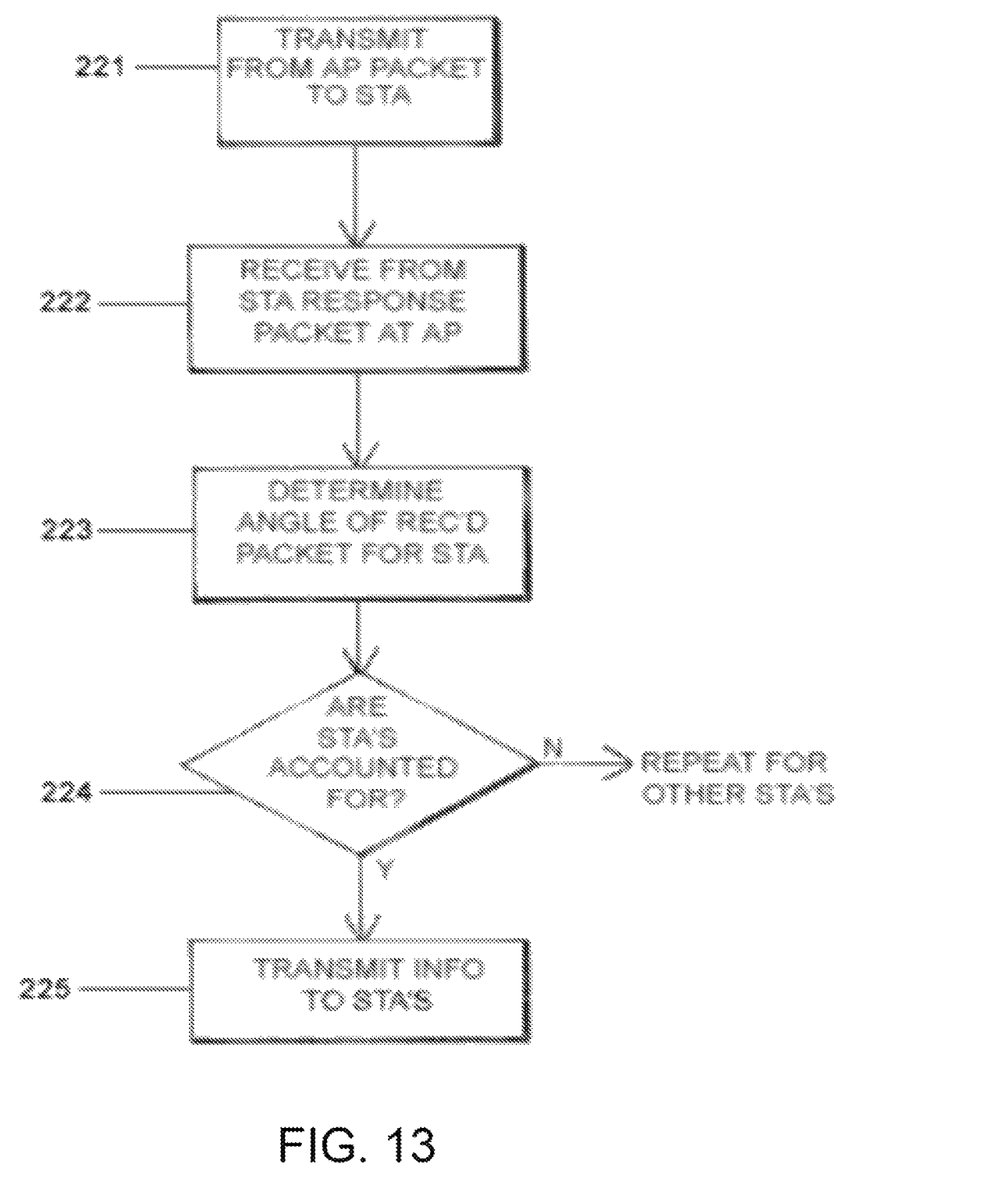
FIG. 13 is a flowchart showing an exemplary routine for measuring AOA, according to an embodiment.
Figure 14:
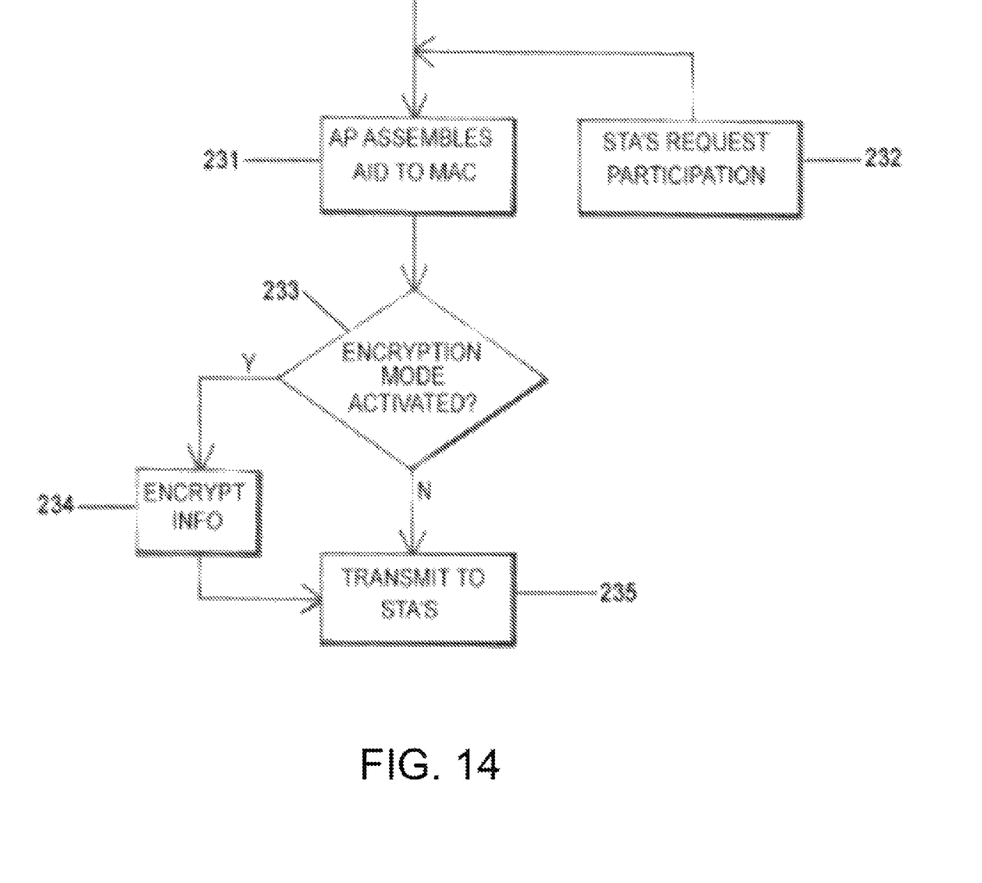
FIG. 14 is a flowchart showing an exemplary routine for mapping AID to a MAC address, according to an embodiment.

As depicted in the flow chart drawing of FIG. 11, location determination may commence with 201 to determine round trip time RTT between AP and a STA. In 202 the routine may continue with determination of angle of arrival AOA at an AP of a packet from a STA. In 203, RTT and AOA information may be transmitted to the STA's. In 204 the STA's may complete the routine by employing RTT and AOA to determine location. Determining RTT is depicted in the flow chart drawing of FIG. 12 which may commence with 211 to record AP departure time of an implicit packet. In 212, the arrival time of a response packet may be recorded. In 213 RTT may be calculated based upon the elapsed time between departure and arrival. The routine continues in 214 in which it may be determined whether all STA's are accounted for. If not, 211 through 213 may be repeated. If yes, in 215 the RTT (along with AOA—see FIG. 13) may be transmitted to the STA's. FIG. 13 depicts the routine for determining AOA. In 221 an implicit packet may be transmitted to a STA leading to receiving in 222 a response packet from the STA. In 223, the routine may continue with determination of the angle of arrival of the response packet from the STA. After determining whether all STA's are accounted for in 224, the AOA information is transmitted to the STA's in 225. FIG. 14 illustrates a flow chart for mapping AID to MAC addresses. In 231 an AP may assemble such address mapping which may be limited to only STA's that have requested participation in 232. If an encryption mode has been activated as depicted in 233, the mapping information may be encrypted in 234. Whether encryption is activated or not, in 235 the mapping information may be transmitted to participating STA's.

Figure 15:
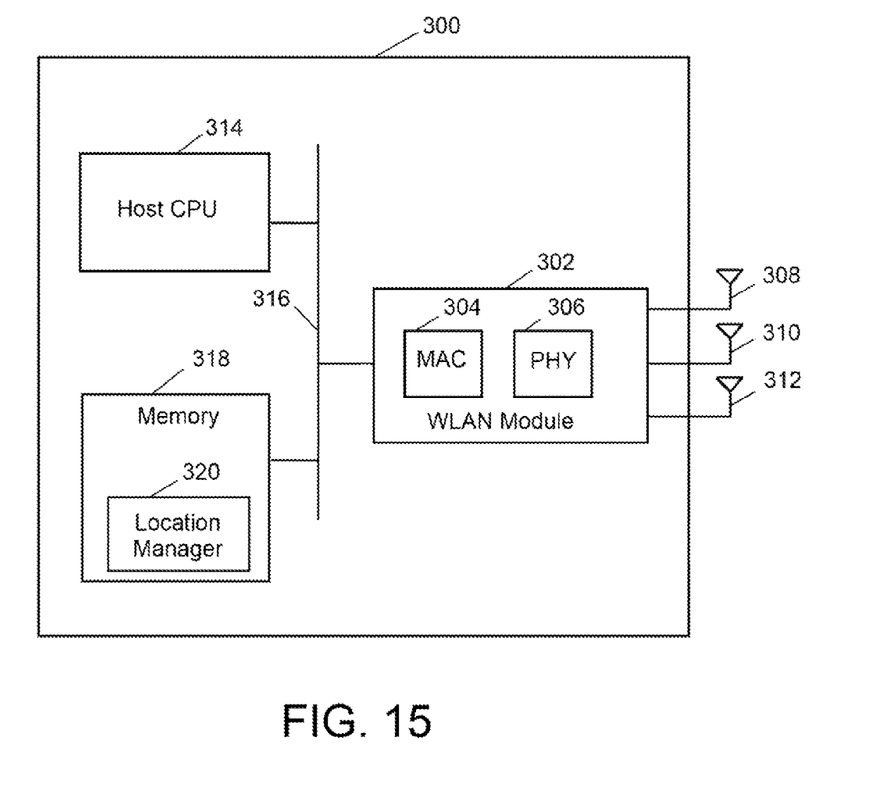
FIG. 15 schematically depicts functional blocks of an AP configured to determine the location of a STA, according to an embodiment.

To help illustrate aspects associated with this disclosure, FIG. 15 depicts high level functional blocks of one embodiment of a wireless communications device 300 that may be configured to function in the role of AP 100 or a STA, such as cell phone 102 or laptop computer 104, to either determine or utilize location information, respectively. As shown, wireless communications device 300 may employ an architecture in which the lower levels of the wireless protocol stack are implemented through firmware and/or hardware in respective subsystems. Wireless communications device 300 may therefore include wireless protocol circuitry as indicated by WLAN module 302, having media access controller (MAC) 304 to perform functions related to the handling and processing of frames of data including verification, acknowledgment, routing, formatting and the like. Incoming and outgoing frames are exchanged between MAC 304 and physical layer (PHY) 306, which may include the functions of modulating the frames according to the relevant 802.11 protocol as well as providing the analog processing and RF conversion necessary to provide transmission and reception of wireless signals through antennas 308, 310 and 312. The use of at least two antennas allows wireless communications device 300 when functioning in the role of AP 100 to make appropriate AOA measurements regarding incoming implicit frames. As will be appreciated, the use of a greater number of antennas, such as the three as shown in FIG. 15 or more, may provide increased resolution for the AOA measurement. When functioning in the role of a STA, wireless communications device 300 may employ a single antenna since the STA does not measure AOA. However, it will be recognized that any number of antennas may be used as desired, such as to enable the use of multiple streams of data.

Wireless communications device 300 may also include host CPU 314 configured to perform the various computations and operations involved with the functioning of wireless communications device 300, in its role as either AP 100 or STA 102 or 104. Host CPU 314 may be coupled to WLAN module 302 through bus 316, which may be implemented as a peripheral component interconnect express (PCIe) bus, a universal serial bus (USB), a universal asynchronous receiver/transmitter (UART) serial bus, a suitable advanced microcontroller bus architecture (AMBA) interface, a serial digital input output (SDIO) bus, or other equivalent interface. Upper layers of the protocol stacks of the wireless protocols may be implemented in software stored in memory 318 that may be accessed by host CPU 314 over bus 316.

In the embodiment shown, wireless communications device 300 includes location manager 320 configured to determine location information for STAs within the network or to process received location information. For example, when acting in the role of AP 100, location manager 320 may measure RTT and AOA using implicit communications subsequently disseminate the determined location information to the network as described above. Likewise, when acting in the role of STA 102 or 104, location manager 320 may be configured to process received location information, such as in the form of RTT and AOA Measurements IE or AID to MAC Address IE, in order to attain location awareness for its position or for the position of other STAs in the network.

In the depicted embodiment, location manager 320 may be implemented as processor-readable instructions stored in memory 318 that may be executed by host CPU 314. However, it will be appreciated that location manager 320 may be implemented in any location using any combination of software, firmware and hardware as desired. As will be appreciated, location manager 320 may cooperate with MAC 304 to determine the necessary timing characteristics to measure RTT or to measure AOA, as well as transmit or receive location information.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art, are expressly incorporated herein by reference and are intended to be encompassed by the claims. Moreover, nothing disclosed herein is intended to be dedicated to the public regardless of whether such disclosure is explicitly recited in the claims.

What is claimed is:

1. In a wireless communications network having an access point and at least one station associated with the access point, a method of determining a location of the at least one station comprising:
   determining with the access point a round trip time (RTT) of a wireless transmission including a first implicit frame sent from the access point to the at least one station and a second implicit flame sent from the at least one station to the access point;
   determining with the access point an angle of arrival (AOA) of a wireless transmission including a first implicit frame sent from the at least one station to the access point; and
   multicasting with the access point location information including the determined RTT and the determined AOA for the at least one station.

2. The method of claim 1, further comprising determining with the access point RTT and AOA for each of a plurality of stations, wherein multicasting the location information includes the determined RTT and the determined AOA for each of the plurality of stations.

3. The method of claim 2, wherein the determined RTT and the determined AOA for each of the plurality of stations is correlated with a network address identifier (AID).

4. The method of claim 3, further comprising multicasting with the access point mapping information that associates the AID for each of the plurality of stations with an identification that is independent of the wireless communications network.

5. The method of claim 4, further comprising encrypting the mapping information prior to the multicasting.

6. The method of claim 5, further comprising transmitting a key for. decrypting the mapping information with the access point to a subset of the plurality of stations that have elected to participate in location determination.

7. The method of claim 1, wherein determining the RTI comprises:
   recording a departure time for the first implicit frame;
   recording an arrival time for the second implicit frame; and
   determining the RTT based at least in part on the departure time and the arrival time.

8. The method of claim 7, wherein determining the RTT further comprises compensating for a short interframe space (SIFS) between the first implicit flame and the second implicit frame.

9. The method of claim 1, wherein multicasting location information comprises including the determined RTT and the determined AOA into a beacon transmission.

10. In a wireless communications network having an access point and a station associated with the access point, a method of determining a location of the station comprising:
   receiving with the station at least a first implicit frame transmitted by the access point;
   transmitting with the station at least a second implicit frame to the access point;
   receiving with the station a multicast from the access point having location information including a round trip time (RTT) and an angle of arrival (AOA) determined based at least in part on the implicit flames; and determining at the station the location of the station based at least in part on the multicast location information.

11. The method of claim 10, wherein the multicast location information received from the access point includes a determined RTT and a determined AOA for at least one additional station, further comprising determining at the station a location of the at least one additional station based at least in part on the determined RTT and the determined AOA.

12. The method of claim 11, further comprising determining a position of the station relative to the at least one additional station based at least in part on the determined location of the station and the determined location of the at least one additional station.

13. The method of claim 11, wherein the determined RTT and the determined AOA for the at least one additional station is correlated with a network address identifier (AID).

14. The method of claim 13, further comprising receiving with the station a multicast from the access point having mapping information that associates the AID for the at least one additional station with an identification that is independent of the wireless communications network.

15. The method of claim 14, wherein the mapping information multicast by the access point is encrypted, further comprising receiving with the station a key for decrypting the mapping information from the access point transmitted to stations that have elected to participate in location determination and using the key to decrypt the mapping information.

16. A wireless communications device for determining a location of a station in a wireless local area network (WLAN) comprising a WLAN module and a location manager, wherein the location manager is configured to:
determine a round trip time (RTT) of a wireless transmission including a first implicit flame sent from the wireless communications device to a first station and a second implicit frame sent from the first station to the wireless communications device;
determine an angle of arrival (AOA) of a wireless transmission including a first implicit frame sent from the first station to the wireless communications device; and
multicast location information with the WLAN module including the determined RTT and the determined AOA for the first station.

17. The wireless communications device of claim 16, wherein the location manager is further configured to determine RTT and AOA for each of a plurality of stations and wherein multicasting location information includes the determined RTT and the determined AOA for each of the plurality of stations.

18. The wireless communications device of claim 17, wherein the determined RTT and the determined AOA for each of the plurality of stations is con elated with a network address identifier (AID).

19. The wireless communications device of claim 18, wherein the location manager is further configured to multicast with the WLAN module mapping information that associates the AID for each of the plurality of stations with an identification that is independent of the wireless communications network.

20. The wireless communications device of claim 19, wherein the mapping information is encrypted.

21. The wireless communications device of claim 20, wherein the location manager is further configured to transmit with the WLAN module a key for decrypting the mapping information to a subset of the plurality of stations that have elected to participate in location determination.

22. The wireless communications device of claim 16, wherein the location manager is configured to determine the RTT by:
recording a departure time for the first implicit frame;
recording an arrival time for the second implicit frame; and
determining the RTT based at least in part on the departure time and the arrival time.

23. The wireless communications device of claim 22, wherein the location manager is further configured to determine the RTT by compensating for a short interframe space (SIFS) between the first implicit flame and the second implicit flame.

24. The wireless communications device of claim 16, wherein the location manager is configured to multicast location information with the WLAN module by including the determined RTT and the determined AOA into a beacon transmission.

25. A wireless communications device for determining a location of the wireless communications device in a wireless local area network (WLAN) managed by an access point comprising a WLAN module and a location manager, wherein the location manager is configured to:
receive at least a first implicit frame transmitted by the access point;
transmit with the WLAN module at least a second implicit frame to the access point; and
determine a location of the wireless communications device based at least in part on location information multicast by the access point that includes a round trip time (RTT) and an angle of arrival (AOA) determined based at least in part on the implicit flames.

26. The wireless communications device of claim 25, wherein the multicast of location information received from the access point includes a determined RTT and a determined AOA for at least one additional station and wherein the location manager is further configured to determine a location of the at least one additional station based at least in part on the determined RTT and the determined AOA.

27. The wireless communications device of claim 26, wherein the location manager is further configured to determine a position of the wireless communications device relative to the at least one additional station based at least in part on the determined location of the wireless communications device and the determined location of the at least one additional station.

28. The wireless communications device of claim 26, wherein the determined RTT and the determined AOA for the at least one additional station is correlated with a network address identifier (AID).

29. The wireless communications device of claim 28, wherein the location manager is further configured to associate the AID for the at least one additional station with an identification that is independent of the wireless communications network based at least in part on mapping information multicast by the access point.

30. The wireless communications device of claim 29, wherein the mapping information multicast by the access point is encrypted and wherein the location manager is further configured to decrypt the mapping information from the access point using a key transmitted by the access point to stations that have elected to participate in location determination.

* * * * *